United States Patent [19]

Nakamura et al.

[11] Patent Number: 4,626,079

[45] Date of Patent: Dec. 2, 1986

[54] DARK FIELD ILLUMINATION APPARATUS FOR EPI-ILLUMINATION SYSTEM

[75] Inventors: Eiji Nakamura; Yutaka Suenaga, both of Yokohama, Japan

[73] Assignee: Nippon Kogaku K.K., Tokyo, Japan

[21] Appl. No.: 721,403

[22] Filed: Apr. 9, 1985

[30] Foreign Application Priority Data

Apr. 13, 1984 [JP] Japan .................................. 59-74245
Apr. 24, 1984 [JP] Japan .................................. 59-82455

[51] Int. Cl.$^4$ ............................................ G02B 21/10
[52] U.S. Cl. .................................... 350/525; 350/434; 350/443
[58] Field of Search ............... 350/525, 526, 527, 524, 350/523, 434, 443, 453

[56] References Cited

U.S. PATENT DOCUMENTS

| | | | |
|---|---|---|---|
| 1,943,510 | 1/1934 | Bauersfeld et al. | 350/525 |
| 2,884,992 | 7/1958 | Bernhardt | 350/525 |
| 4,186,993 | 2/1980 | Shimizu et al. | 350/525 |
| 4,475,796 | 10/1984 | Kimura | 350/525 |

*Primary Examiner*—Jon W. Henry
*Attorney, Agent, or Firm*—Shapiro and Shapiro

[57] ABSTRACT

In dark field illumination apparatus for epi-illumination system, in order to attain the above and other objects, the present invention provides an annular light beam which is coaxial with the optical axis of the objective lens and is supplied along an optical path formed surrounding the objective lens. An annular condenser member is arranged near the object side end of the objective lens in such manner that the beam reaches the object surface while being concentrated in the direction toward the optical axis by the condenser member.

10 Claims, 20 Drawing Figures

DARK FIELD ILLUMINATION APPARATUS FOR EPI-ILLUMINATION SYSTEM

BACKGROUND OF THE INVENTION

1. Field of the Invention

The present invention relates to dark field illumination in the epi-illumination system, more particularly an illumination optical apparatus to be incorporated in an objective lens of an epi-illumination type microscope.

2. Description of the Prior Art

The dark field illumination is known and used for epi-illumination type microscopes in which an annular beam of light is supplied to an annular condenser member for condensing the light on the object surface. The annular beam which is emitted from the area surrounding the objective lens of the microscope, is coaxial with the optical axis of the objective lens. The annular condenser member which receives the annular beam is provided near the fore end of the objective lens. At present there is a tendency to increase the numerical aperture as well as the working distance of the objective lens. With this tendency the aperture of the objective lens is increasing more and more. Because of the large lens aperture, it is now very difficult to supply a sufficient quantity of dark field illumination light from the area surrounding the objective lens employing the conventional epidark illumination system. Besides this problem, the prior art epidark illumination system has the following disadvantages:

For those objective lenses having high magnification, the prior art system so intensively condenses the annular beam on the object surface that an image of the light source may be formed near the object surface, which often produces the problem of irregular illumination. In order to solve the problem, it has already proposed to interpose a diffusing plate in the illumination optical path. Although the diffusing plate has an effect to improve the uniformity of illumination, a substantial decrease of light intensity is caused thereby. To compensate the decreased intensity of illumination light, it is required to increase the luminance which in turn shortens the life of the light source.

Since the annular beam is heavily concentrated by the annular condenser member disposed in the vicinity of the fore end of the objective lens, there is produced aberration which also brings forth the problem of irregular illumination.

SUMMARY OF THE INVENTION

Accordingly it is an object of the invention to provide an epidark illumination system which is able to provide a sufficient quantity of illumination light even for those objective lenses having large aperture. It is another object of the invention to provide an epidark illumination system which can supply an illumination light for uniformly illuminating the dark field. In order to attain the above and other objects, the present invention provides an illumination system in which an annular light beam which is coaxial with the optical axis of the objective lens is supplied along an optical path formed surrounding the objective lens. An annular condenser member is arranged near the object side end of the objective lens in such manner that the beam reaches the object surface while being concentrated in the direction toward the optical axis by the condenser member.

In one aspect of the invention, an annular lens member having a negative refractive power is provided in the optical path of the annular light beam to the annular condenser member.

The annular lens member expands the diameter of the annular light beam. This arrangement enables guiding of the annular beam to the fore end of the objective lens however large the lens aperture may be. Therefore it is assured that a sufficient quantity of dark field illumination light is always supplied onto the object surface by the annular condenser member. If necessary, an annular lens member having a positive refractive power may be interposed between the negative annular lens member and the annular condenser member in order to collimate the diverging beam from the negative annular lens member. In another aspect of the invention, annular first and second deflector members are provided in the optical path of the annular light beam to the annular condenser member. The first deflector is disposed to deflect the annular optical path outwardly. The second deflector is disposed to deflect the outward-deflected annular optical path inwardly. The second deflecting member has a larger diameter than the first one. A converging toroidal surface is formed in one of the two deflectors. On the other one there is formed a diverging toroidal surface. The converging toroidal surface on one deflector and the diverging toroidal surface on the other deflector together form an afocal system substantially. When the first deflector has the converging toroidal surface and the second deflector has the diverging toroidal surface, the width of the annular beam emerging from the second deflector may be narrower than the width of the annular beam incident on the first deflector. On the contrary, when the diverging toroidal surface is formed on the first deflector and the converging toroidal surface on the second deflector, the width of the annular beam exiting from the second deflector is allowed to be larger than the width of the annular beam incident on the first deflector. The first-mentioned embodiment in which the annular beam from the second deflector has a narrower width is advantageous for a relatively narrow illumination area as required by a high magnification objective lens. The second-mentioned embodiment in which the annular beam from the second deflector has a broader width is advantageous for a relatively wide illumination area as required by a low magnification objective lens. The annular light beam supplied around the objective lens is generally a collimated light beam. Therefore, the afocal system composed of the toroidal surfaces on the first and second deflectors supplies a collimated light beam to the annular condenser member. This enables realization of an illumination apparatus which is high in efficiency and compact in construction. These and further objects, features and advantages of the present invention will appear more fully from the following description taken in connection with the accompanying drawings.

DESCRIPTION OF PREFERRED EMBODIMENTS

Figure 1:
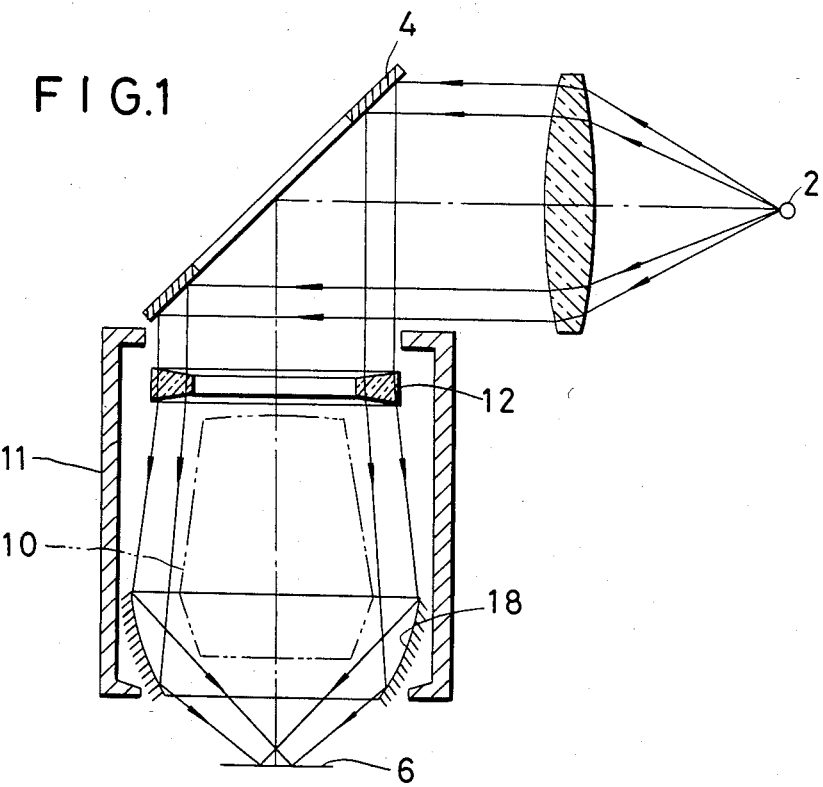
FIG. 1 is a sectional view schematically showing a first embodiment of the invention.
Figure 2A:
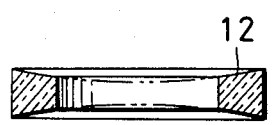
FIGS. 2A and 2B are a sectional view and a plan view of the annular lens member of negative refractive power in the first embodiment.
Figure 2B:
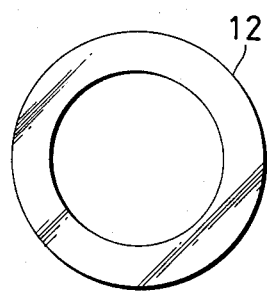

Referring first to FIG. 1 showing the first embodiment of the invention, a light source 2 emits illumination light which is collimated into an annular beam of illumination light. The light beam is reflected toward the area surrounding an objective lens 10 by a slant annular reflecting mirror 4 mounted in the housing of a microscope. The objective lens 10 is mounted in a lens tube 11. For the purpose of this specification, the end of the objective lens on which the illumination light beam is incident, is hereinafter referred to as the rear end of the objective lens 10. The end opposite to it is referred to as the fore end. Near the rear end of the objective lens 10 within the lens tube 11 there is provided an annular lens member of negative refractive power 12 by which the light beam is diverged. In the vicinity of the fore end of the objective lens there is provided an annular condenser member 18 which is, in this embodiment, formed as an annular concave reflecting mirror. The mirror 18 guides the illumination light beam onto an object surface 6. As clearly seen from FIGS. 2A and 2B, the annular member 12 is an annular negative lens having an inner diameter a little larger than the effective aperture of the incidence surface of the objective lens. The annular light beam entering the annular lens member 12 is subjected to the diverging action of the member 12 so that the beam diameter is expanded by it. The expanded beam falls on the reflecting mirror 18.

Figure 3:
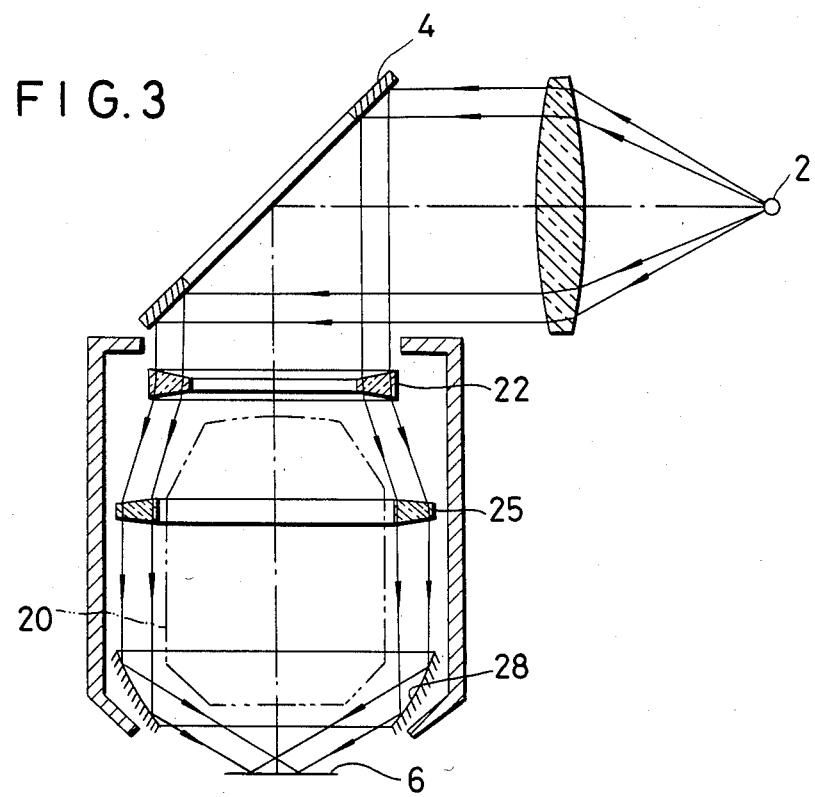
FIG. 3 is a schematic sectional view showing a second embodiment of the invention.
Figure 4A:
FIGS. 4A and 4B are a sectional view and a plan view of the negative annular lens member in the second embodiment.
Figure 5A:
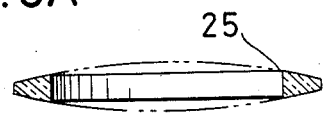
FIGS. 5A and 5B are a sectional view and a plan view of the positive annular lens member in the second embodiment.
Figure 4B:
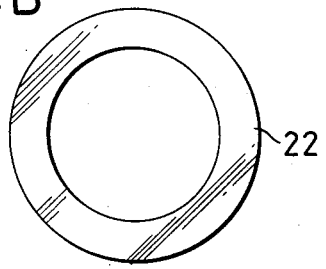
Figure 5B:
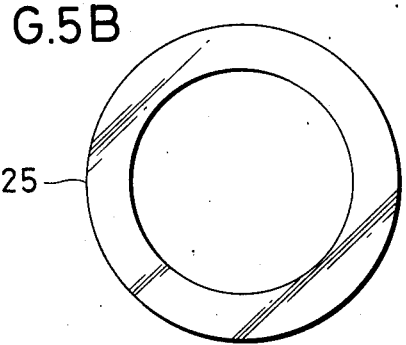

FIG. 3 shows a second embodiment. Around an objective lens 20 there are arranged a negative annular lens element 22 and an annular concave reflecting mirror 28 corresponding to the lens member 12 and the reflecting mirror 18 in the above-shown first embodiment. The difference between the first and second embodiments is found in an annular lens member 25 of positive refractive power interposed between the lens member 22 and the reflecting mirror 28. The detailed forms of the lens members 22 and 25 in the second embodiment are shown in FIGS. 4A, 4B and 5A, 5B respectively. The lens member 25 has a larger aperture than the lens member 22. The lens member 22 makes the annular light beam divergent. The lens element 25 receives the divergent beam and converts it into a collimated beam.

In the area between the lens member 25 and the reflecting member 28, the annular light beam has a constant annular cross-section. Therefore it is possible to keep the aperture of the objective lens constant as a whole in this area. This enables realization of a compact construction of the whole apparatus. Further, the combination of negative and positive annular lens members enables better correction of aberration, especially of chromatic aberration. Therefore, according to this embodiment, a better light beam can be supplied for illuminating the dark field.

The negative and positive annular lens members 12, 22 and 25 used in the above embodiments can be made in a simple manner by boring a center hole in an ordinary negative or positive lens. Therefore, it is relatively easy to obtain the annular lens members with high precision.

Figure 6:
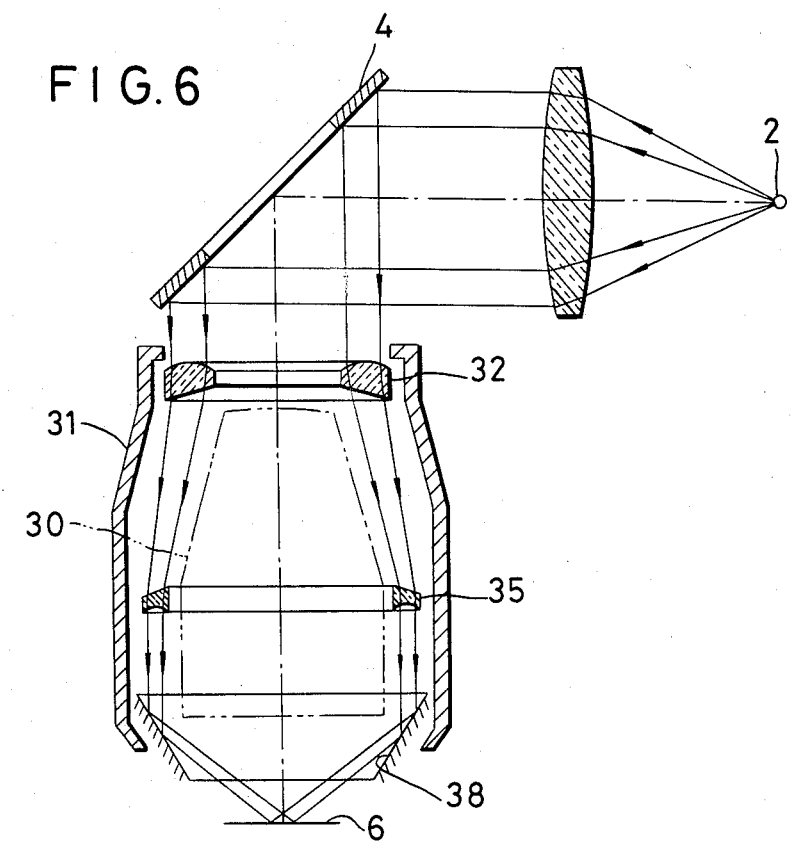
FIG. 6 is a sectional view schematically showing a third embodiment of the invention.

FIG. 6 shows a third embodiment of the invention. In this embodiment, an annular positive lens member 32 having a toroidal surface is provided near the rear end of an objective lens 30 within a lens tube 31. The annular positive lens member 32 deflects the illumination light beam outwardly while converging the beam. The outward-deflected converging beam enters an annular negative lens member 35 having a toroidal surface thereon. The annular negative lens member 35 converts the convergent light beam into a collimated light beam travelling substantially parallel to the optical axis of the objective lens 30. The collimated beam enters an annular reflecting mirror 38 comprising a cone reflecting surface by which the collimated beam from the negative lens member 35 is reflected toward the object surface 6.

Figure 7A:
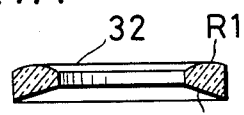
FIGS. 7A and 7B are a sectional view and a plan view of the annular positive lens in the third embodiment.
Figure 7B:
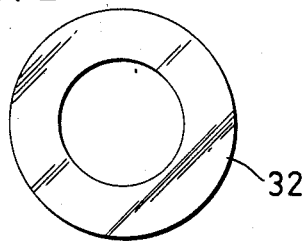

As seen from FIGS. 7A and 7B, the incidence surface (R1) of the positive lens member 32 is a convex toroidal surface having a converging action. The exit surface (R2) is formed as a conical refractive surface following the shape of a cone whose apex lies in the direction of incidence of the illumination light beam.

Figure 8A:
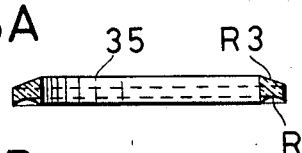
FIGS. 8A and 8B are a sectional view and a plan view of the deflector member for inward deflection in the third embodiment.
Figure 8B:
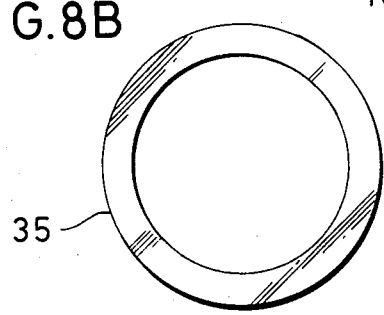

The detailed form of the negative lens member 35 is shown in FIGS. 8A and 8B. The incidence surface (R3) is a conical refractive surface formed following the shape of a cone whose apex lies in the direction of incidence of the illumination light beam. The exit surface (R4) is formed as a concave toroidal surface having a diverging action.

The entrance surface (R2) of the positive lens member 32 has an action to deflect the annular beam outwardly whereas the exit surface (R3) of the negative lens member 35 has an action to deflect the annular beam inwardly. The converging action of the entrance surface (R1) of the positive lens member 32 and the diverging action of the exit surface (R4) of the negative lens member 35 serve together also to form substantially an afocal system. The aperture of the positive lens member 32 is a little larger than the aperture on the rear side of the objective lens 30. The aperture of the negative lens member 35 is substantially equal to the aperture of the condenser member 38. In this third embodiment also, good correction of aberration for the illumination light beam can be assured by the combination of toroidal surfaces of negative and positive refractive powers.

Figure 9:
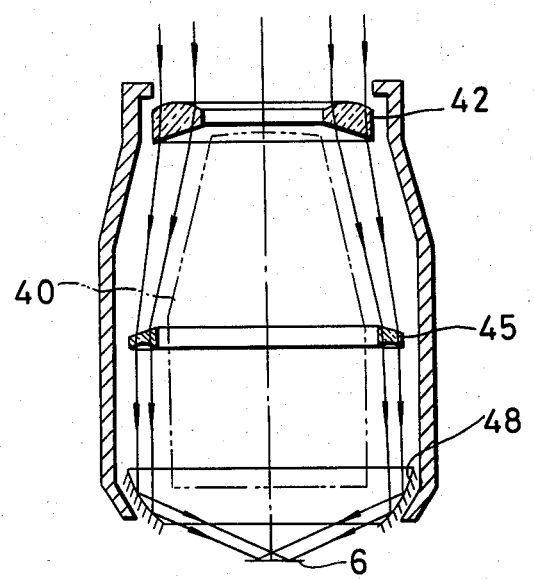
FIGS. 9 to 15 are schematic sectional views of fourth to tenth embodiments of the invention respectively.

In the fourth embodiment shown in FIG. 9, negative and positive annular lens members 42 and 45 similar to the lens members 32 and 55 previously shown in FIG. 6 are arranged around an objective lens 40. An important feature of this embodiment resides in the use of a concave annular reflecting mirror 48 as the annular condenser member. The concave reflecting mirror 48 has an action to converge the illumination light beam. Therefore, with this embodiment, it is possible to illuminate a narrow object area at a high brightness as required for a high magnification objective lens. Since the combination of deflectors 42 and 45 for outward deflection and inward deflection allows narrowing of the width of the annular illumination light beam, it is not necessary for the condenser member 48 to have any strong converging action. Only a weak converging action is needed. Since the diameter of the beam to be converged is small and the converging action to be needed is very weak, the aberration generated thereby is very small, which improves the uniformity of illumination as compared with the prior art. Furthermore, the relatively small converging action of the condenser member 48 means a longer focal length. Therefore, it is possible to enlarge the working distance.

Figure 10:
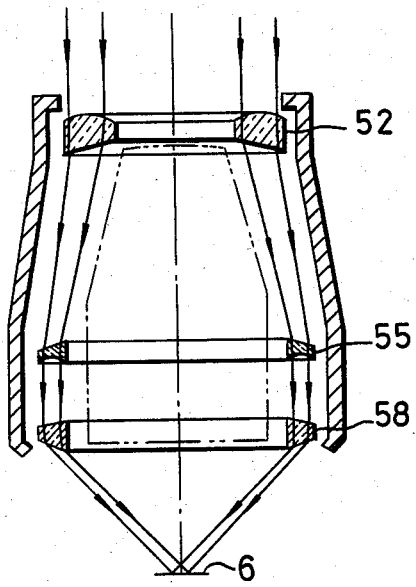

FIG. 10 shows a further embodiment. In this embodiment, as the annular condenser member, there is used an annular prism 58.

Lens members 52 and 55 functionally correspond to the lens members 42 and 45 previously shown in FIG. 9. In FIG. 10, the fifth embodiment has been shown to illuminate the object surface with a collimated light beam. However, it is to be understood that the object surface can be illuminated with a converging beam or with a diverging beam according to the view field of the objective lens by replacing the annular prism by an annular positive lens or an annular negative lens.

Figure 11:
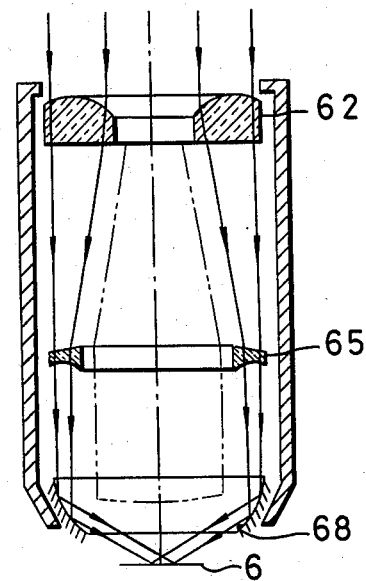

FIG. 11 shows a sixth embodiment which includes a set of annular lens members 62 and 65 each having a circular toroidal surface. More particularly, the positive lens member 62 has a convex toroidal surface which is in the form of a circle eccentric in a cross section containing the optical axis of the objective lens and deflects the annular beam outwardly while converging the beam. As shown in the figure, the positive lens member 62 may be formed as to have a flat exit surface perpendicular to the optical axis and as not to have any positive prism action. The negative lens member 65 has a concave toroidal surface made eccentric in a cross section containing the optical axis of the objective lens and deflects the annular beam inwardly while diverging the beam at the same time. Although the entrance surface of the negative lens member 65 has been shown as a conical surface having a prism action for increasing the strength of the action to deflect the beam inwardly, it is to be understood that the entrance surface may be formed also as a flat surface normal to the optical axis. With the embodiment shown in FIG. 11, the outer peripheral rays of the annular beam are guided to the condenser member 68 without being deflected under the well-balanced prism action and lens action. Therefore, it is possible to guide the annular beam to the condenser member 68 while expanding the inner diameter only without changing the outer diameter of the annular beam so much.

Figure 12:
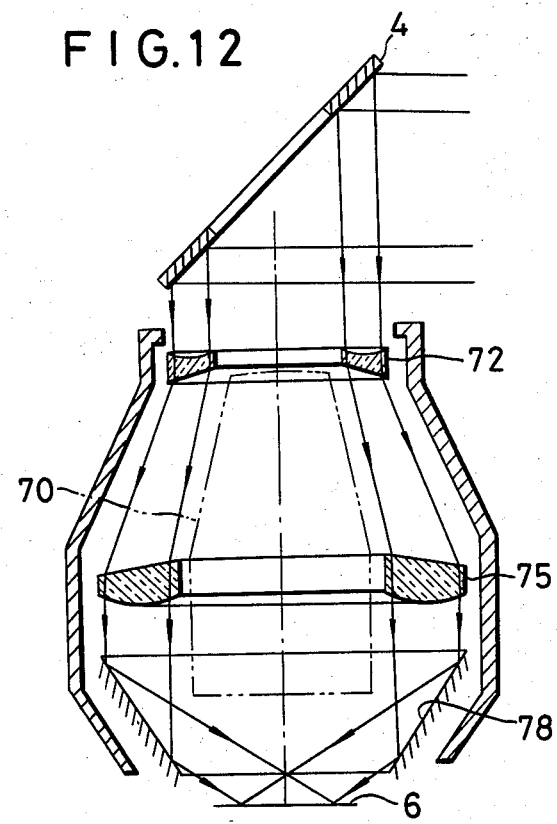

FIG. 12 shows a seventh embodiment of the invention in which a diverging toroidal surface is formed on the deflector for outward deflection and a converging toroidal surface is formed on the deflector for inward deflection thereby expanding the width of the annular light beam. This embodiment is advantageous for illuminating a relatively broad object surface in the case of a low magnification objective lens. In this embodiment, the annular illumination light beam is deflected outwardly and also diverged by the concave toroidal surface of the annular negative lens 72. The divergent beam then enters the annular positive lens 75 having a convex toroidal surface by which the beam is converted into a collimated beam travelling substantially in parallel with the optical axis of the objective lens 70. The collimated beam falls upon an annular reflecting mirror 78 which is, in the shown embodiment, a conical reflecting surface. The exit surface of the negative lens 72 and the entrance surface of the positive lens 75 are conical refractive surfaces. The diverging action of the entrance surface of the negative lens 72 and the converging action of the exit surface of the positive lens 75 form together an afocal system in substance. Therefore, the aperture of the annular beam is expanded by the outward-deflecting action of the negative lens 72. This enables increasing the aperture of the condenser member 78. As a result, it is possible to supply a sufficient quantity of dark field illumination light to the object surface 6 even for those objective lenses which have a large aperture.

Further, as the width of the annular beam reaching the condenser member 78 can be expanded, this embodiment is advantageous for illuminating a relatively broad object surface as in the case of a low magnification objective lens.

Figure 13:
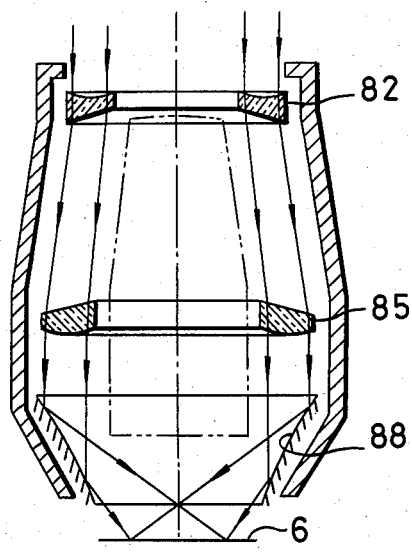

FIG. 13 shows a further embodiment (8th embodiment) in which lenses 82 and 85 correspond to the lenses 72 and 75 previously shown in FIG. 12. The eighth embodiment further comprises a convex annular mirror 88 having a weak diverging power. With the arrangement of this embodiment, a broader object area as required for a lower magnification objective lens can be illuminated well.

Since the width of the annular beam incident on the convex mirror 88 is large, the diverging action which the reflecting mirror 88 has to have may be weak. Therefore, the aberration generated by the diverging is very small. Uniform illumination is assured over the broader object area.

Figure 14:
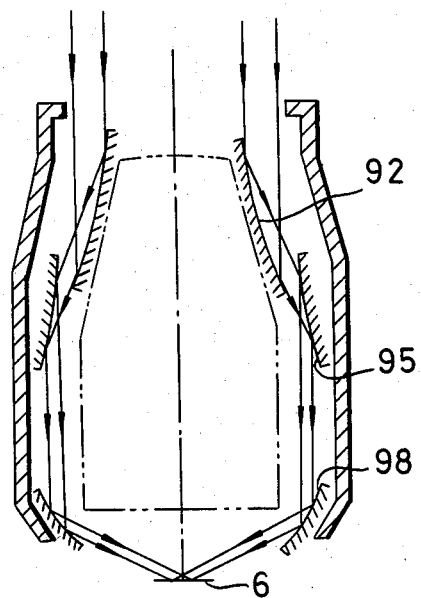
Figure 15:
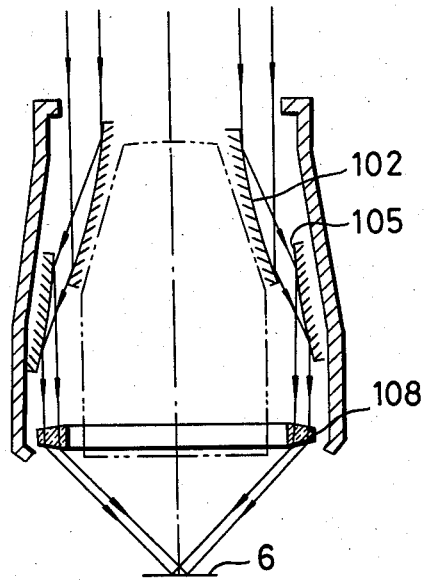

In the above embodiments, both of the deflector members for outward deflection and inward deflection have been formed by refractive systems using annular lens members. However, it is to be understood that one or both of the deflecting members may be formed also by a reflection system or systems. Such embodiments are shown in FIGS. 14 and 15 as 9th and 10th embodiments.

In the 9th and 10th embodiments, both of the deflection members for outward deflection and for inward deflection are formed by annular reflective members. More particularly, an annular concave reflecting mirror 92 or 102 is used as the member for deflecting the beam outwardly. An annular convex reflecting mirror 95 or 105 is used as the member for deflecting the beam inwardly. Like the first to sixth embodiments, the annular illumination light beam in the ninth and tenth embodiments is guided to the condenser member while expanding the aperture of the annular beam and reducing the width of the annulus of the beam. Further, as seen from FIGS. 14 and 15, according to the embodiments using reflective systems as the deflector members, it is also possible to guide the annular beam to the object surface while shifting light rays from inner to outer and from outer to inner each other. As the condenser member, an annular concave reflecting mirror 98 is used in the embodiment shown in FIG. 14, and an annular prism member 108 is used in the FIG. 15 embodiments.

Obviously many modifications and variations of the present invention are possible in the light of the above teachings within the scope of the following claims.

We claim:

1. Apparatus for illuminating an object to be observed through an objective lens, said apparatus comprising:
   (a) a lens tube member for supporting the objective lens therein in such manner as to provide an annular space between the objective lens and the lens tube member;

(b) means for supplying an annular light beam toward the object through the space;

(c) an annular negative lens disposed within the space with an optical axis being common to the optical axis of the objective lens, said negative lens having an action to diverge the annular beam in a direction away from said optical axis;

(d) an annular condenser member having an optical axis common to the optical axis of the objective lens and provided in the vicinity of one end of the objective lens opposed to the object, said condenser member having an action to direct the divergent annular beam toward said object; and (e) an annular positive lens having an optical axis common to the optical axis of the objective lens and disposed between the negative lens and the condenser member within the space;

said positive lens cooperating with the negative lens to form substantially an afocal system.

2. Apparatus according to claim 1, wherein said annular condenser member includes a concave reflecting surface.

3. Apparatus for illuminating an object to be observed through an objective lens, said apparatus comprising:

(a) a lens tube member for supporting the objective lens therein in such manner as to provide an annular space between said objective lens and the lens tube member;

(b) means for supplying an annular light beam toward the object through the space;

(c) a first annular deflector member located within the space and disposed coaxially with the optical axis of the objective lens to deflect the annular beam in a direction away from said optical axis;

(d) a second annular deflector member located within the space and disposed coaxially with the optical axis of the objective lens to deflect the annular beam deflected by said first annular deflector member in a direction substantially parallel with said optical axis, wherein one of said first and second annular deflector members has a converging toroidal surface and the other has a diverging toroidal surface and said converging and diverging toroidal surfaces together form substantially an afocal system; and (e) an annular condenser member having an optical axis common to the optical axis of the objective lens and located in the vicinity of one end of said objective lens opposed to the object to direct the annular beam deflected by said second annular deflector member toward said object.

4. Apparatus according to claim 3 wherein said first annular deflector member has an entrance surface formed by the toroidal surface thereof to which said annular beam is incident, and an exit surface formed by a conical surface, and said second annular deflector member has an entrance surface formed by a conical surface and an exit surface formed by the toroidal surface thereof.

5. Apparatus according to claim 4, wherein said entrance surface of the first annular deflector member is formed by a convex toroidal surface and said exit surface of the second annular deflector member is formed by a concave toroidal surface.

6. Apparatus according to claim 4, wherein said entrance surface of the first annular deflector member is formed by a concave toroidal surface and the exit surface of the second annular deflector member is formed by a convex toroidal surface.

7. Apparatus according to claim 4, wherein each conical surface of said first and second annular deflector members is formed as a part of the surface of a cone coaxial with said optical axis and the apex of which faces to the incidence direction of said annular beam.

8. Apparatus according to claim 3, wherein the first annular deflector member has a convex toroidal surface and the second annular deflector member has a concave toroidal surface.

9. Apparatus according to claim 3, wherein the first annular deflector member has a concave toroidal surface and the second annular deflector member has a convex toroidal surface.

10. Apparatus for illuminating an object to be observed through an objective lens, said apparatus comprising:

a lens tube member for supporting the objective lens therein in such manner as to provide an annular space between the objective lens and the lens tube member;

means for supplying an annular light beam toward the object through the space;

an annular diverging optical member disposed within the space with an optical axis being common to the optical axis of the objective lens, said diverging optical member having an action to diverge the annular beam in a direction away from said optical axis;

an annular condenser member having an optical axis common to the optical axis of the objective lens and provided in the vicinity of one end of the objective lens opposed to the object, said condenser member having an action to direct the divergent annular beam toward said object; and an annular converging optical member having an optical axis common to the optical axis of the objective lens and disposed between the diverging optical member and the condenser member within said space, said converging optical member cooperating with the diverging optical member to form substantially an afocal system.

* * * * *